United States Patent [19]
Kauffman et al.

[11] Patent Number: 5,857,203
[45] Date of Patent: Jan. 5, 1999

[54] METHOD AND APPARATUS FOR DIVIDING, MAPPING AND STORING LARGE DIGITAL OBJECTS IN A CLIENT/SERVER LIBRARY SYSTEM

[75] Inventors: Steven Victor Kauffman, San Jose; Lara Marie Lewis, Campbell; Ronald Elliott Parrish, San Jose, all of Calif.

[73] Assignee: International Business Machines Corporation, Armonk, N.Y.

[21] Appl. No.: 688,116

[22] Filed: Jul. 29, 1996

[51] Int. Cl.⁶ .................................................. G06F 17/30
[52] U.S. Cl. ........................... 707/200; 707/10; 707/103
[58] Field of Search ..................... 707/103, 10; 395/610, 395/614

[56] References Cited

U.S. PATENT DOCUMENTS

| | | | |
|---|---|---|---|
| 4,092,732 | 5/1978 | Ouchi | 395/182.03 |
| 5,175,851 | 12/1992 | Johnson | 707/8 |
| 5,367,698 | 11/1994 | Webber | 395/200.33 |
| 5,371,885 | 12/1994 | Letwin | 707/205 |
| 5,375,128 | 12/1994 | Menon et al. | 371/40.15 |
| 5,448,727 | 9/1995 | Annevelink | 707/101 |
| 5,454,103 | 9/1995 | Coverston et al. | 707/205 |
| 5,497,463 | 3/1996 | Stein | 395/200.33 |
| 5,522,077 | 5/1996 | Cuthbert | 395/683 |
| 5,541,911 | 7/1996 | Nilakantan et al. | 370/422 |
| 5,555,388 | 9/1996 | Shaughnessy | 711/100 |
| 5,649,185 | 7/1997 | Antognini et al. | 707/9 |
| 5,649,196 | 7/1997 | Woodhill | 707/204 |

OTHER PUBLICATIONS

Abraham Silberschatz et al., "Operating System Concepts", Addison–Wesley Publishing Company, Apr., 1989.

*Primary Examiner*—Wayne Amsbury
*Assistant Examiner*—Diane D. Mizrahi
*Attorney, Agent, or Firm*—Sughrue, Mion, Zinn, Macpeak & Seas, PLLC

[57] ABSTRACT

The present invention is directed to a method and apparatus for supporting large digital objects. More particularly it relates to a client/server library system in which a large digital object is divided into smaller pieces which are stored in the client/server library system. By dividing the large digital object into smaller pieces, system limitations regarding object size are avoided. In one embodiment of the present invention the pieces are stored as files of variable size. Moreover, the pieces can be stored on separate object servers which can be located remotely from one another.

36 Claims, 5 Drawing Sheets

METHOD AND APPARATUS FOR DIVIDING, MAPPING AND STORING LARGE DIGITAL OBJECTS IN A CLIENT/SERVER LIBRARY SYSTEM

BACKGROUND OF THE INVENTION

1. Field of the Invention

This invention relates to the field of information and storage management and, more particularly, to storage and retrieval of large binary objects.

2. Description of the Related Art

Client/server object storage systems have been used to store and manage a wide variety of digital objects such as documents, graphics, audio, video, spread sheets and word-processing text. Such digital objects are known generally as binary lo large objects (blobs).

A conceptual view of a conventional client/server system is shown in FIG. 1 and includes a library server 10, one or more object servers 20 and a library client 30. Each of the library and object servers and the library client includes an information store. That is, the library server 10 includes a library catalog 12, the is object server 20 includes an object store 22 and the library client 30 includes a client cache 32, as shown in FIG. 2. Also, a communications isolator (not shown) is included which allows the library server, object server and library client to communicate with one another without concern for complex communications protocols. The library server, object servers and library clients are connected by a communications network, such as a wide-area network (WAN), but also can be locally connected via a local area network (LAN).

In the conventional library client/server system the library client is typically embodied in a workstation, such as a personal computer, and the library and object servers are typically embodied in a host processor: generally a mainframe computer.

The library clients 30 each send requests to the library server 10 to store, retrieve, and update objects stored in one or more of the object servers, and to update and query the object indices and descriptive information stored in library catalog 12. Library client requests are generated by library patrons. These patrons are users who have been granted privileges for the use of the library system.

Two types of library servers have been used, a host based library server (HBLS) and a LAN based library server (LBLS). The HBLS, is a program which can be implemented in a mainframe computer in an IBM MVS/ESA (Multiple Virtual Storage/Enterprise Systems Architecture) environment running under the Customer Information & Communication System (CICS). The library catalog with which it interacts can be implemented with an IBM DATABASE 2 (DB2) database.

Before a library client request is processed, library server 10 checks library catalog 12 to ensure that the patron's name and password are valid. Next, the library server ensures that the patron has been granted the appropriate privileges to perform the requested action. Each patron is assigned a set of privileges by a system administrator. An example of a library privilege is the ability to delete objects.

Finally, the library server checks to ensure that the object's owner has granted the patron the privileges needed to do what is requested (e.g., update the object). The owner of an object is the patron who first stored the object. When an owner stores an object that owner must specify which other patrons are to have access to the object.

Objects stored in the library system can be checked out by a patron for a specified period of time. This feature can be used to ensure that one patron's updates to an object are not overwritten by another. While an object is checked out by a patron, other patrons can retrieve the object and view it, but they cannot update it. In typical implementations, there are groups of individuals who need access to the same objects. Therefore, to simplify the process of granting access to objects a system administrator can define patrons as members of a group. When a patron is defined as a member of a group, that patron is able to access any object for which the group has been granted privileges. Additionally, patrons can access objects for which they have been specifically granted individual privileges. A patron can set default groups whose members will have access to the objects the patron stores. When patrons store objects, they have the option to use this default group, to grant specific privileges to groups and individual patrons, or to do both.

If a library client request involves the storage, retrieval, or update of an object, library server 10 forwards the request to the object server 20 that contains or will store the object(s) referred to in the request based upon information provided by library catalog 12. If the library client request is a query of the information stored in library catalog 12, library server 10 will interact only with library catalog 12 and will not contact object server 20.

The library catalog is analogous to a conventional library's card catalog. It is a single set of database tables which contain an index of all the objects stored in the library system. In addition, it can store information such as textual descriptions for each object, information on the type of object (e.g., image object, spreadsheet, text document), library patron names and privileges, access authorization data for each object, links between objects. The library catalog can also store a virtually unlimited number of property type/property value pairs for each object (e.g., name/John, Age/35, Address/1 Greenway Drive). These property type/property value pairs are known as an object's properties.

The library server contains a parts table 14, as shown in FIG. 3, which resides in the library catalog 12. For each part in the library system library server 10 stores information about that part. As shown in the parts table 14 in FIG. 3, the information stored for a part includes an item identifier (ID), a part number, a representation type (REP type) and an object server ID.

When a part is stored in the conventional client/server library system, library server 10 assigns an item ID and a part number, which are 16 bytes and 4 bytes long, respectively. The item ID is a unique identifier for an item to which the part belongs. For example, an item could represent a folder in which the part represents a document within that folder. Likewise, the part number is a unique identifier for that part.

The REP type field can be used to indicate the type or class in which the part is classified. For example, if the part is an image stored in a TIFF format, the REP type for that part could indicate that the part is a TIFF formatted image.

An object server 20 maintains objects stored within the library system. Objects are stored or retrieved from an object store 22 by object server 20. Object server 20 receives requests from library server 10 and communicates with library client 30 to complete the requests. Such a library system can contain several distributed object servers. The object server field in the library server's parts table indicates the identifier for the object server which owns the part. For example, if the part is stored on object store 22 of object server 20, the object server ID field will contain the identifier for object server 20.

Each object server contains an object server table 24 as shown in FIG. 3. The object server 20 uses object server table 24 to manage storage of parts in its storage areas, such as the object store 22. Object server table 24 also contains the same item ID, part number and REP type for the part as does the library server parts table 14. The object server table also contains a file name for the part 28, which indicates the location in object store 22 of stored part 28.

In the conventional library client/server system, object server 20 communicates with the library client 30 via the client cache 32. That is, when an object server retrieves an object from library client 30, it retrieves the object from the client cache 32. Similarly, when sending an object to library client 30, object server 20 places a copy of the object in client cache 32.

Two types of object servers have been used, a host based object server (HBOS) and a LAN based object server (LBOS). The HBOS is a program implemented on a mainframe computer, for example in a MVS/ESA environment running under CICS. It interacts with the IBM Object Access Method (OAM) to provide object storage. The LBOS is a program implemented in a workstation, such as in an OS/2 environment, and provides object storage on a LAN.

When a library patrons's privileges are defined a default object server can be set for the patron. When a patron stores an object, it will be stored in the default object server for that patron. If it is later determined that an object or a group of objects should be relocated to a different object server, a client application can cause those objects to be moved from one object server to another.

An LBOS can be located on any workstation having sufficient hardware resources and is connected to the library server. Furthermore, an LBOS can be located at a site remote from the library server and local to the user. This allows selected objects to be stored close to a remote group of library patrons who will frequently use these objects. This capability is called distributed object storage. Distributed object storage helps to reduce the costs associated with sending objects over telecommunications lines and provides better performance in storing and retrieving objects.

The HBOS interacts with the IBM OAM to implement an object store that is maintained as a set of IBM DB2 tables, such as the object server table 24 discussed above. These DB2 tables can be monitored, backed up, and recovered using standard database utilities. OAM is capable of managing its information store using a s combination of direct access storage devices (DASD) and write once read many (WORM) optical storage.

LBOS implements its object store by using a combination of the LBOS workstation hard drives and an optional optical library subsystem (often called an optical jukebox). The optical library supported by LBOS is capable of storing optical cartridges internally. Shelf-resident optical cartridge support is also provided, thus greatly expanding the storage capacity of the optical server. LBOS controls the migration of objects between the workstation hard drive, which functions as a staging area, and optical storage. Because a workstation's hard drive can access stored information faster than an optical jukebox, LBOS ensures that newly stored objects and objects that have recently been retrieved are maintained on the workstation hard drive. As the workstation hard drive becomes full, LBOS removes those objects to optical storage that has been least recently accessed to free storage space for new objects. A single drive optical drive can also be attached to LBOS to provide a transaction log as a backup mechanism for the optical library.

LBOS includes a variety of storage administration functions, such as transaction logging and the ability to write out duplicate copies of images and files to support full backup and recovery.

The library client 30 is the interface through which application programs can submit requests to the library system. These can include requests to store objects, update/add descriptors to objects, delete objects and query information in the library catalog. Library requests can be submitted through the library client either individually or in batches.

The client cache 32 is a specialized function, implemented on a user's workstation. The cache is used to locally hold copies of objects that have been stored to or retrieved from the object server. These local copies allow very fast access to objects and provide a means for communicating between the library client and the servers. When a library client requests a copy of an object from the library server, the library server causes a copy of that object to be sent from the object server which owns it to the library client that requested it. The object is stored in the client cache of the requesting library client. When library request orders are submitted by library client 30 to library server 10 a copy of the request is also stored in client cache 32.

FIG. 2 illustrates the data flow in a conventional digital client/server library system. A library client, such as library client 30, can be located remotely from the library server 10 and object server 20. Typically, the library client 30 is connected to library server 10 and object server 20 via a WAN. Moreover, object server 20 may be connected to library server 10 via a WAN.

When a requesting library client 30 requests an object, or blob, it sends a request 1 to library server 10. Upon receipt of the request library server 10 consults the parts table 14, among other tables, in the library catalog 12 and determines which object server owns and has the requested object stored in its object store 22. Here, the owning object server is shown as object server 20 to which library server 10 issues a request 2 which contains the item ID, part number and REP type of the requested part. Upon receiving the request, object server 20 retrieves the blob from object store 22 by consulting its object server table 24 and sends a copy of it to client 30. The double line 3 shown in FIG. 2 indicates a copy of the blob which is transmitted from object server 20 to requesting client 30. Object server 20 stores the blob in client cache 32. When the blob is successfully transmitted to client cache 32 object server 20 sends a response 4 to library server 10 upon successful transfer of the blob to client cache 32. Library server 10, in turn, sends a response 5 to requesting library client 30 indicating to the client that the blob was successfully transferred, which allows the client to retrieve the blob from client cache 32 for use by a client application.

When an application program submits a request for storage of an object in the conventional library system library client 30 creates a copy of the object in its client cache 32 to allow the appropriate object server 20 to retrieve the object. The library client then sends a storage request 1 to library server 10. Included in the storage request is a handle to the object stored in the client cache 32. The handle is an identifier which is used to locate the object in the client cache.

Upon receiving the storage request 1, library server updates tables in library catalog 12, including the parts table 14 as shown in FIG. 3, to identify the object server 20 in which the object is to be stored. Typically, the object server is selected by default based on the user's identity. Library server 10 then sends a request 2 to object server 20 to retrieve the blob from the client cache 32 and store it in the object store 22, in which library server 10 passes the handle of the object stored in client cache 32 and the item ID, part number and REP type of the part.

The object server 20, upon receiving the request 2 to retrieve a copy of the object stored in client cache 32 then retrieves a copy of the object 3, or blob, and stores that copy in object store 22, generally for archival purposes and updates its object server table 24 accordingly to indicate a file name for the blob stored in object store 22. As shown in FIG. 3 the file name uniquely identifies the location of the blob stored in object store 22.

Upon successfully storing a copy of the blob, object server 20 sends a response 4 to library server 10 to notify it that the object was successfully stored. Library server 10 then updates its tables including the parts table 24 to indicate that the object is successfully stored in object server 20. The library server 10 sends a response 5 to library client 30 indicating that the object was successfully stored so that the library client can take further action based on the fact that the object was successfully stored in object store 22, such as deallocating memory resources for that object in client cache 32.

The conventional client/server library system has mechanisms, as described above, to efficiently store and retrieve parts that range up to about 10 Mb. However, in the conventional library client and object server an object, or blob, must be totally constituted in memory in several places within the system as it is being processed on its path to file storage. When objects get too big for a given configuration of available memory and network access, they cannot be processed because not enough system resource is available to create an in-storage copy. The external symptom when these resource constraints are reached is a timeout of the library client that is waiting for a response from the server. Even in cases where the timeout values are set very high and the object is successfully stored the response time to move it is unacceptably slow.

File systems are known which divide a file into blocks which are smaller than the entire file in order to store the file information on a storage device, such as a disk drive. For example, the Unix file system stores a file on a disk in data blocks of fixed size (see A. Silberschatz, *Operating System Concepts*, pp. 488–96, 1989). These data blocks, however, have a fixed size, such as 8,192 bytes. Since these blocks have a fixed size, some known file systems employ two difference block sizes: a large block size for most of the blocks used, and a smaller block size, such as 1024, in order to minimize fragmentation. Accordingly, the Unix file system stores a file in small blocks which are stored on the disk device. The Unix system employs an index node which is called an inode, which contains a record concerning the particular data blocks in which the file is stored. The inode contains pointers to the data blocks which comprise a file.

A problem with known file systems, such as the Unix file system, is that data blocks are limited to fixed sizes and cannot be readily changed after a file has been stored. Accordingly, changes in stored files can cause a change to data within a particular block which causes a ripple effect throughout the blocks stored, such that the file data for the entire file needs to be stored again in order to have the data redistributed throughout the allocated blocks.

Other file systems, such as the high performance file system (HPFS), disclosed by Letwin in U.S. Pat. No. 5,371, 885, store data in variable length record forms. For example, Letwin shows in FIG. 5c, and discusses in column 7 through 9 an FNODE which contains an allocation structure 546 which points to a plurality of sector runs. Sector runs are defined to be sets of contiguous sectors on a disk. The allocation structure of the FNODE points to the beginning of a sector run and indicates the length in sectors corresponding to the number of contiguous sectors in that sector run. Accordingly, in the HPFS system a file is still allocated in terms of fixed size units, namely sectors, and is limited to defining units of storage which are physically contiguous on a device, such as a disk drive. The HPFS system does not allow for arbitrarily varying the length of the sector runs since the sector run representation in the allocation structure 546 is related to the sectors which are physically contiguous with one another on a disk. Accordingly, even the HPFS system would suffer from the above described problems.

SUMMARY OF THE INVENTION

It is an object of the present invention to solve the problems of the conventional client/server library system relating to storage of large objects.

The present invention relates to a number of strategies that increase the size of the objects that the system can handle. Some of these strategies affect the way the objects are stored, and others affect how the system processes the objects. All of the changes are made in a way that do not affect current users of existing small objects. Most of these strategies allow existing programs to process much larger objects without requiring recompilation.

The present invention operates to divide a large file into smaller pieces. That is, the present invention divides a large file into smaller pieces which are themselves files, and creates a list of those pieces. A unique aspect of the present invention is in how the techniques are adapted in the conventional client/server digital library system.

To achieve the above object the present invention provides a method for storing and managing objects in a distributed information storage management system including a client, an object server for storing an object and a centralized server having information stored therein regarding the location of the object and the client, the method comprising the steps of:

a) dividing a digital object into a plurality of pieces, wherein each of said pieces is smaller than said digital object;

b) generating a piece map for storing piece identification information identifying each of said pieces;

c) transmitting each of said pieces and said piece map from the client to the object server, storing the transmitted pieces and piece map in the object server and storing information about each of said pieces and said piece map in said centralized server.

Also to achieve the above object the present invention provides a system for storing and managing objects, comprised of: a client for dividing a digital object into a plurality of pieces; one or more object servers for storing a piece map and said plurality of pieces, wherein said piece map includes piece identifying information identifying each of said plurality of pieces; and a centralized server having a parts table for storing said piece identifying information and piece location information identifying which one of said object servers each of said plurality of pieces is stored, and storing piece map identification information identifying said piece map and piece map location information identifying one of said object servers within which said piece map is stored.

BRIEF DESCRIPTION OF THE DRAWINGS

The above and other objects and advantages of the invention will become more apparent and more readily appreciated from the following detailed description of the presently preferred embodiments of the invention taken in conjunction with the accompanying drawings, of which.

DETAILED DESCRIPTION OF THE PREFERRED EMBODIMENTS

Figure 1:
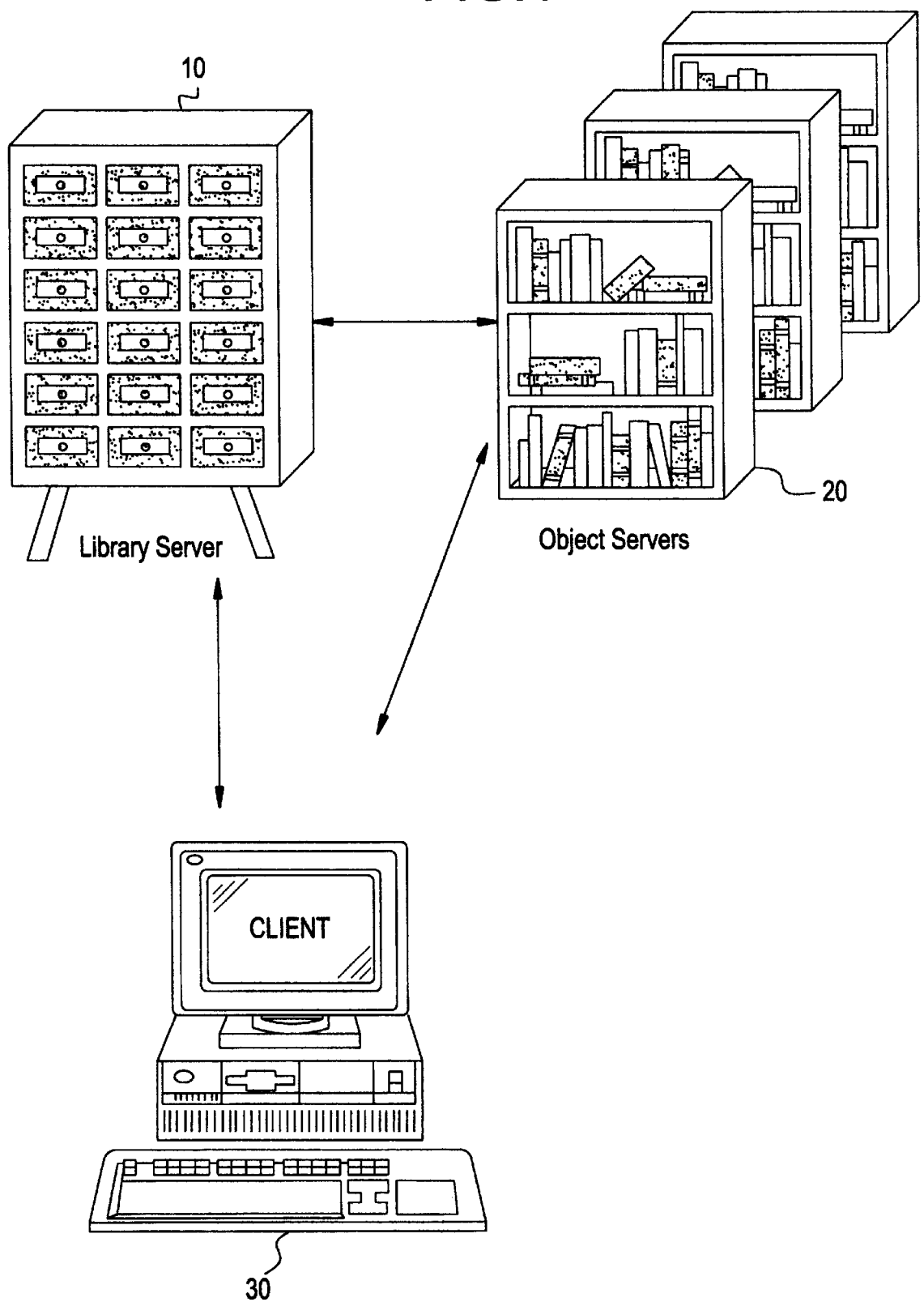
FIG. 1 is a conceptual view of a conventional client/server library system.

The embodiments of the present invention are described below in more detail with reference to the above drawings, in which like reference numerals refer to the same or similar elements.

Most operating systems have limits on the size of an individual file. Multimedia files can approach and exceed these limits. For example, a full length motion picture when digitized can approach 100 gigabytes (Gb). If a part corresponding to a multimedia object is stored in a client/server library system as set of files, such limits can be avoided.

The conventional client/server library system has mechanisms to efficiently store and retrieve parts that range up to about 10 Mb. As these parts move within the system, copies are made on disk and in virtual memory for performance and to preserve the system state in the event of a failure. The mechanisms that create and manage these copies are complex and not easily modified. Any change to the conventional client/server library system to enable larger objects should not disrupt or change existing objects stored in the system or the applications programs that use them.

The present invention solves the problem of storing large objects by storing a large binary object, or blob, as an ordered set of smaller pieces. Further, the present invention employs a directory object, or piece map, that points to the set of smaller objects which can be reconstituted into the single large object. The piece map is itself an object stored in the client/server library system and substitutes for the entire set of smaller pieces when referencing the large object via the library client. The piece map contains an ordered sequence of identifiers and lengths of the actual content objects or pieces. In a preferred embodiment the piece identifiers are assigned a piece number. The length of each piece is included in the piece map to allow the system to maintain objects that are longer than the length that can be encoded into the length field of the conventional client/server library system, which is 32 bits long. Dividing the large object into a plurality of smaller pieces also allows an intermediary part of a large object to be modified without accessing the beginning parts of the object.

In the conventional client/server library system all parts have a part number. In the present invention large parts are stored as a sequence of smaller pieces which have the same part number as the large part. Another field (i.e., the REP type field) is used to link the smaller parts together. The part stored in parts table 14 corresponding to the piece map contains the original user-provided REP type value. However, the REP type field for the piece entries in the parts table 14 is used as a secondary, or piece counter to identify the piece within the sequence of pieces for the large object.

Users are unaware that the large objects are stored as a sequence of smaller pieces. The part behavior of the client/server library system remains unchanged from that in the conventional client/server library system. That is, the present invention allows most of the conventional client/server library system to manage the parts therein without the knowledge that they may constitute a larger object.

The present invention divides the large object into pieces when it is initially accessed and processes and stores those pieces. The pieces are reconstituted into the complete object when the object is delivered to an end user. Preferably an environment variable indicates the largest size object to be processed on a particular client/server library system. Objects larger than this value will always be broken up into smaller pieces.

The method to break up the large object, or blob involves creating a piece map in a data structure which is stored as the first piece of the multi-piece blob. The pieces of the blob are stored as subsequent parts for the particular item ID and part number related to the object. When the large object is retrieved, the map is retrieved first and the large object is reconstituted from the pieces, based on the piece numbers and the piece lengths obtained from the piece map.

Figure 4:
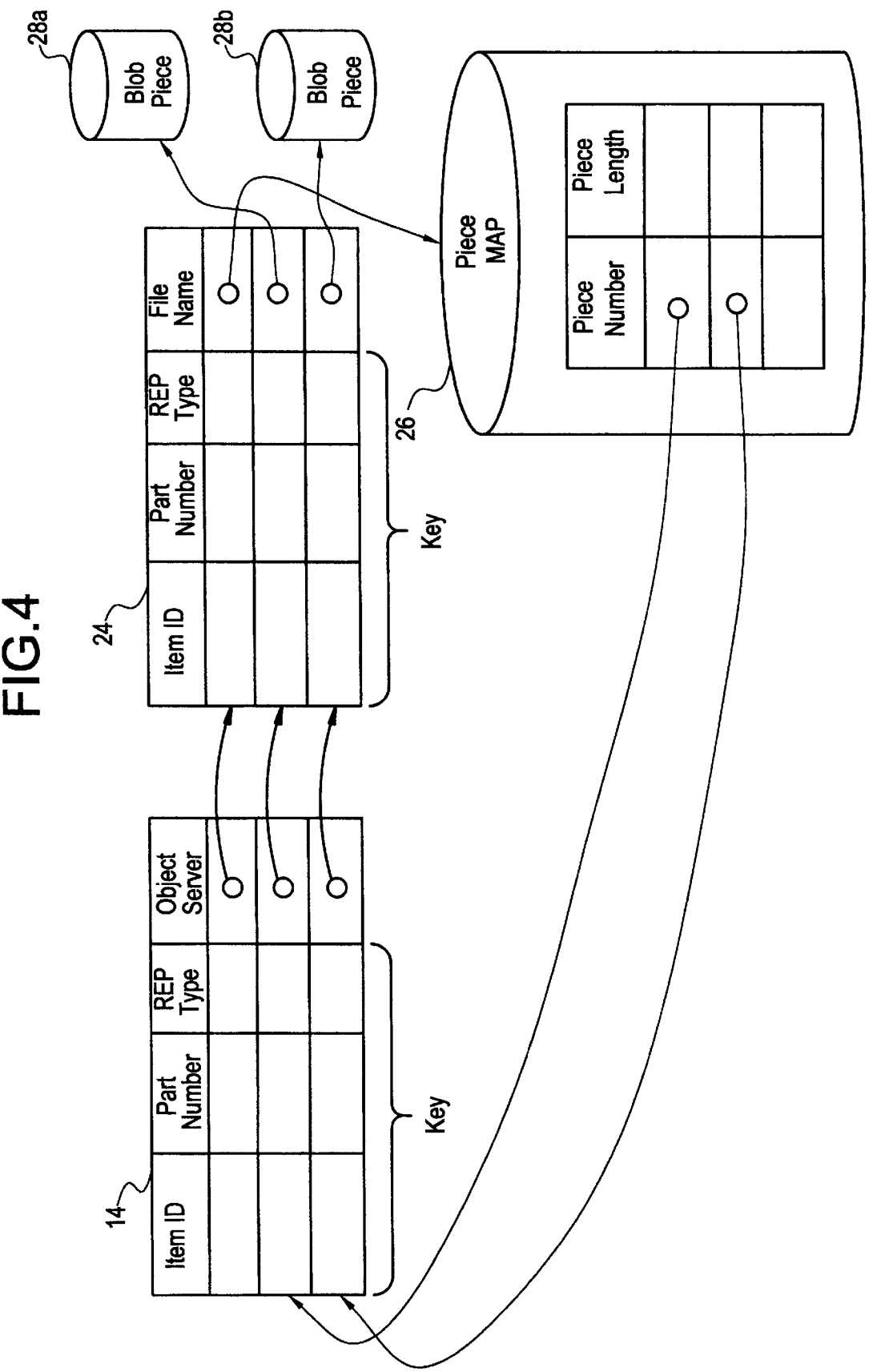
FIGS. 4 shows a portion of the parts table of the library server and the object server table of the object server in the client/server library system according to the present invention.

FIG. 4 shows a schematic diagram of a piece map 26 which contains information for each piece of a large object. Each entry in piece map 26 corresponds to a piece and includes a piece number and a length of that piece. The piece number references a unique entry in parts table 14, as shown in FIG. 4.

From an external view, the stored parts have only one part number. This maintains for the end user the integrity of part numbers for the large objects. Internally this is accomplished by using the REP type field as an additional counter for the pieces. Since the ItemID/PartNum/REP type triple is a unique identifier, multiple parts per item ID can be stored which all have the same part number. The entry in parts table 14 for piece map 26 includes a REP type which is initially assigned to the large object, and all other pieces for that large object have the piece counter value stored in the REP type field of the particular piece.

A PartLoc field of the parts table is the link between the pieces and the map. In the conventional client/server library system when a part is stored in the object server, the value in the PartLoc field is set to a predetermined value, for example, DOCSSMANAGED. In the present invention the PartLoc value is different for the stored pieces of the large blob. For example, the value stored in the PartLoc field for a piece is "FFFF" which is concatenated with the ItemID/PartNum/RepType of the map. The map contains sufficient information to find all the other pieces.

The pieces cannot be individually processed by any existing application programming interface (API) unless the API has been specifically modified to process pieces, as opposed to parts. The piece map also contains sufficient information so that the object can be built at the object server for delivery on a path external to the library client.

The piece map preferably contains a header which indicates, among other things, the size of the original large object and the number of pieces comprising the large blob. A preferred data structure for the piece map header is as follows:

```
typedef struct
{
ULONG    ulHdrLength          Header length
ULONG    ulNumberOfPieces     Piece counter
ULONG    ulMapSize            Total length of the map
ULONG    ulBlobSize           Original blob size
ULONG    ulReserved[4]
CHAR     cMapIDData[20]       Map identification data
PIECEMAP *pPieceMap
} PIECEMAPHDR, PPIECEMAPHDRr;
```

The following is a preferred variable array constituting a piece map, the size of which depends on the number of pieces for the original large object. The array is held in contiguous storage following the header, and preferably is defined by the following data structure.

```
typedef struct [ ]
{
ULONG    ulPieceNum           Piece number
ULONG    ulPieceSize          Piece length
ULONG    ulReserved[2]
CHAR     cPieceReptype[9]     Reptype counter for this piece
CHAR     cReserved[3]
} PIECEMAP, *PPIECEMAP
```

Operation of the present invention is described below.

Figure 2:
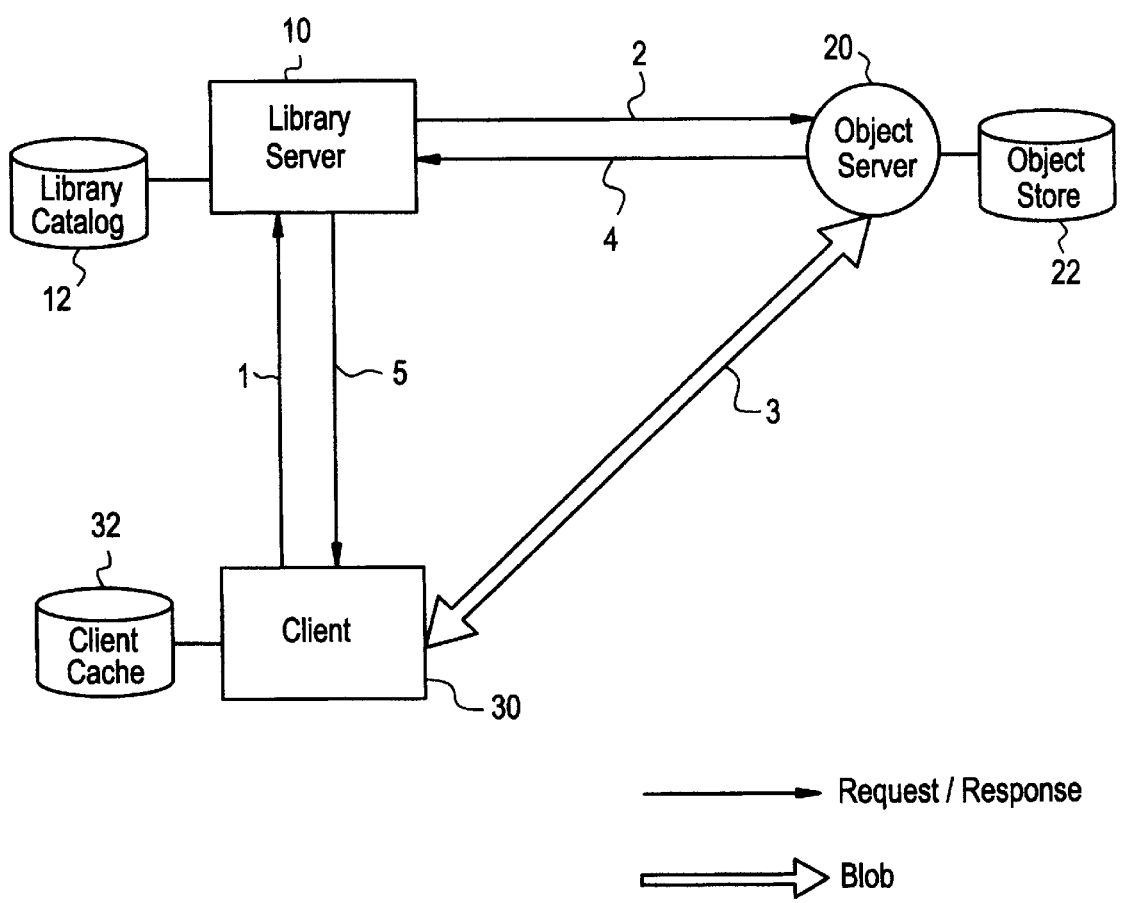
FIG. 2 is a diagram showing flows in a conventional client/server library system.
Figure 3:
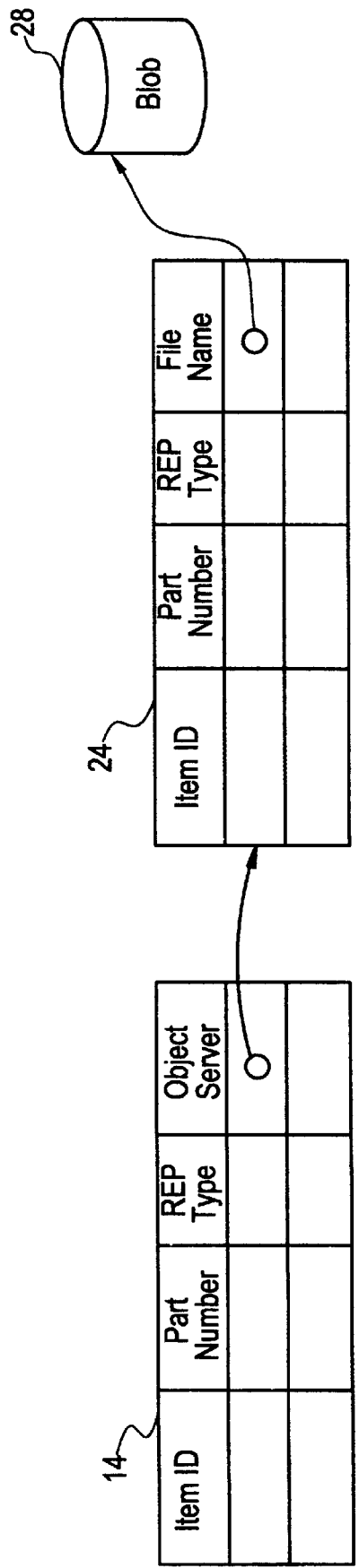
FIG. 3 shows a portion of the parts table in the library server, and the object server table in the conventional client/server library system.

A large object or blob is stored by an application program via the library client 30 as shown in FIG. 2. In the present invention when library client 30 stores the blob in object server 20, under control of the library server 10, the library client 30 determines whether the object to be stored exceeds a predetermined maximum value. This maximum value is preferably stored in an environment variable, such as MAXPIECE. For example, MAXPIECE values can indicate increments of 1 megabyte (Mb), so that if MAXPIECE=1 objects having a size greater than 1 Mb will be divided into pieces having a size of at least 1 Mb.

Upon an application program storing a object which is greater than the predetermined threshold value, library client 30 will divide the large object into pieces as designated by the predetermined value, i.e., MAXPIECE. For example, if MAXPIECE=1 then the object is divided into pieces of 1 Mb each.

Accordingly, the library client stores each piece as an individual part via the client/server library system protocol discussed above and as shown in FIG. 2.

As shown in FIG. 4, for example, when a large object is stored library client 30 divides it into individual pieces. For purposes of illustration, assume the large object has a size of 1.5 Mb. Library client 30 upon receiving the large object divides it into two pieces: the first piece being 1 Mb and the second piece being 0.5 Mb.

Library client 30 creates a piece map with a header and sends a request to library server 20 to store the piece map 26. Accordingly, library server 20 creates an entry in parts table 14 and assigns a item ID and part number for the piece map, and sets a REP type if specified by the library client. As shown in FIG. 4 the item ID and part number of the piece map 26 constitute a key which is used along with an object server identifier to identify a corresponding entry in the object server table 24 of the specified object server. Also stored in the object server table 24 is a file name which indicates the location of the piece map stored in object store 22. Thus, when an object which has been divided into pieces is initially stored in the library the first step taken by library client 30 is to create a piece map object which is stored in object server 20 and a corresponding entry is placed in parts table 14 of library server 10. Once the piece map is created, library client 30 then stores each of the pieces.

In this instance, the 1 Mb piece is stored by requesting the library server 10 to store the piece. Library server 10 creates an entry in parts table 14 for that piece, in which the piece has the same item ID and part number as the overall object as indicated by the map piece entry. The REP type field is used as a counter to count the number of pieces. In this case, since the first piece for the large object is being stored it will have a REP type value indicating that it is the first piece. Similar to the case of storing a piece map, the object server in which the piece will be stored is identified in the parts table. It should be noted that it is not necessary that the pieces be stored on the same object server as the map or as any other piece of the object. Rather, the pieces can be stored in any object server to which library server 10 has access. For the sake of simplicity, FIG. 4 shows the map and pieces being stored in the same object server.

As shown in object server table 24 the piece is stored as blob piece 28a in object store 22. That is, blob piece 28a is stored under a particular file name, in which that file name is included in the object server table 24 entry for the piece. Also, an entry is created in the piece map which indicates the piece number for that piece and its length, in which the piece number refers to the REP type stored in parts table 14 for the newly stored piece. When the piece number is combined with the item ID and part number for the piece map an index corresponding to the ItemID/PartNum/REPtype key in the parts table is formed.

Similarly, the 0.5 Mb piece is stored in the same manner. That is, an entry is created in parts table 14 for the piece and has the same item ID and part number as the 1 Mb piece, although the REP type is incremented by one. The second piece is stored as blob piece 28b in which an entry is created in the object server table of the object server in which the second piece is stored. Furthermore, piece map 26 is updated to include the piece number for this second piece along with its length, in which the piece number indicates the REP type for the piece as stored in parts table 14.

Once all the pieces for the large object have been successfully stored in object server 20, library server 10 sends a response back to library client 30 indicating that the last piece has been stored. Accordingly, library client 30 notifies the application program that the object has been successfully stored.

An application program can also perform a retrieve function on an object that has been stored as a plurality of pieces. From the application program's point of view an object retrieval would operate as in the conventional client server/library system with the application program having no knowledge that the object has been stored as a plurality of pieces. That is, the application program requests the library client to retrieve a particular object. Library client 30 upon receiving the request from the application program sends a request to library server 10 to retrieve the object. However, library server 10 upon referencing the parts table finds the map piece part in parts table 14 for the specified object. Accordingly, library server causes object server 20 to send a copy of the piece map object 26 to library client 30. Library client 30 then detects whether or not the received object is a piece map type object.

A piece map can be stored with a specific identifying indicator in its header to indicate that it is a map object. For example, a predetermined sequence can be stored at a particular offset within the object. In a preferred example, a 20-character identifier string can be placed at an offset of 32 bytes within the header of the piece map in order to identify the object as a piece map.

If library client 30 detects this piece map indicator it will then decode the piece map to determine the sequence of piece numbers and the piece lengths. Library client 30 then issues, for each determined piece, a request to library server 10 to retrieve that piece by specifying the item ID, piece number and REP type for the piece. Accordingly, library server 10 commands object server 20 to send the piece to library client 30.

Library client 30 also detects the number of pieces in the object from the piece map header contained in the piece map. Once library client 30 has retrieved all of the pieces of the object as determined from the detected number of pieces, it then reconstitutes the large object either in memory or in off-line storage such as on a disk device. The reconstituted object is then passed to the application program.

A unique feature of the present invention is that by storing the pieces as a plurality of files, pieces can be individually updated or changed and stored without affecting the storage of other pieces. That is, a single piece may be modified thereby changing its length either making it longer or shorter depending on the modification. This modified piece can be easily stored in the library system without effecting any other piece since the pieces are stored separately from one another without regard to any particular predetermined size. This is because the pieces are stored as files rather than as fixed size blocks. Moreover, since the present invention employs the facilities of a client/server library system the pieces are not limited to particular storage devices or attributes of those storage devices, but can be stored on practically any device present in the library system.

Accordingly, when an object is to be modified an application program can request that the entire object be retrieved from the library as described above, in which case the application program will make a modification to the object and then store it again in the library system. Alternatively, if the application program has knowledge of a individual piece to be modified it can request that particular piece, have it retrieved, modify it and store it back into the library without regard to changing the length of the piece. That is, the changed pieces are stored without affecting the other stored pieces.

Another feature of the present invention is that pieces can be individually deleted, if desired. If an application program has knowledge that a particular object is stored as a plurality of pieces, it can request that specific pieces of that object be deleted. Further, library client 30 can delete a large object by first retrieving the piece map for that object and either deleting the row in the map for that particular piece to be deleted or alternatively, simply identifying in the piece map that the piece is deleted without having to physically delete the object either from the piece map 26 or from object store 22. Once the map has been updated it is not necessary to take further steps to delete the object. Although, if desired the object can also be physically deleted from object store 22 and the corresponding part removed from parts table 14 via conventional client/server library system operations.

In another embodiment of the present invention pieces can be shared between different large objects. This feature is useful for particular components of a large object that may be reusable. For example, in a multimedia system which stores a video clip, it may be desirable to reuse certain portions of that video clip with other video clips being developed. Part sharing is possible in the conventional client/server library system, however, update and delete operations in the conventional client/server library system would introduce errors in the piece maps of the present invention. This is because in the conventional client/server library system updating or deleting a piece, such as a separately stored piece of a blob, would not also update a piece map corresponding to that updated or deleted piece. Accordingly, sharing of pieces introduces a usage management strategy which requires updates to piece maps. The present invention supports such sharing of pieces without having to replicate those pieces, thereby saving storage space.

In this embodiment when a large object is stored it is stored along the lines discussed above. That is, a map is first created for a first large object, in this case piece map 1 shown in FIG. 5 which corresponds to the first object, i.e., object 1. Pieces of the first object are stored in the manner described above. For example, the first piece of object 1 is stored as blob piece 28*a*. The piece number for this first piece is stored in piece map 1 which references parts table 14, which in turn references object server table 24, in which the file name identifies blob piece 28*a*.

A second large object, i.e., object 2, can also be stored. Again, when object 2 is stored a piece map for that object is created, in this case piece map 2. An entry is created in parts table 14 for object 2 which references piece map 2, and the pieces for object 2 are stored. In this case, the first piece of object 2 is stored as blob piece 28*b* in which case the piece number is stored in piece map 2 which references parts table 14, which in turn references object server table 24, which identifies the piece as blob piece 28*b*.

Figure 5:
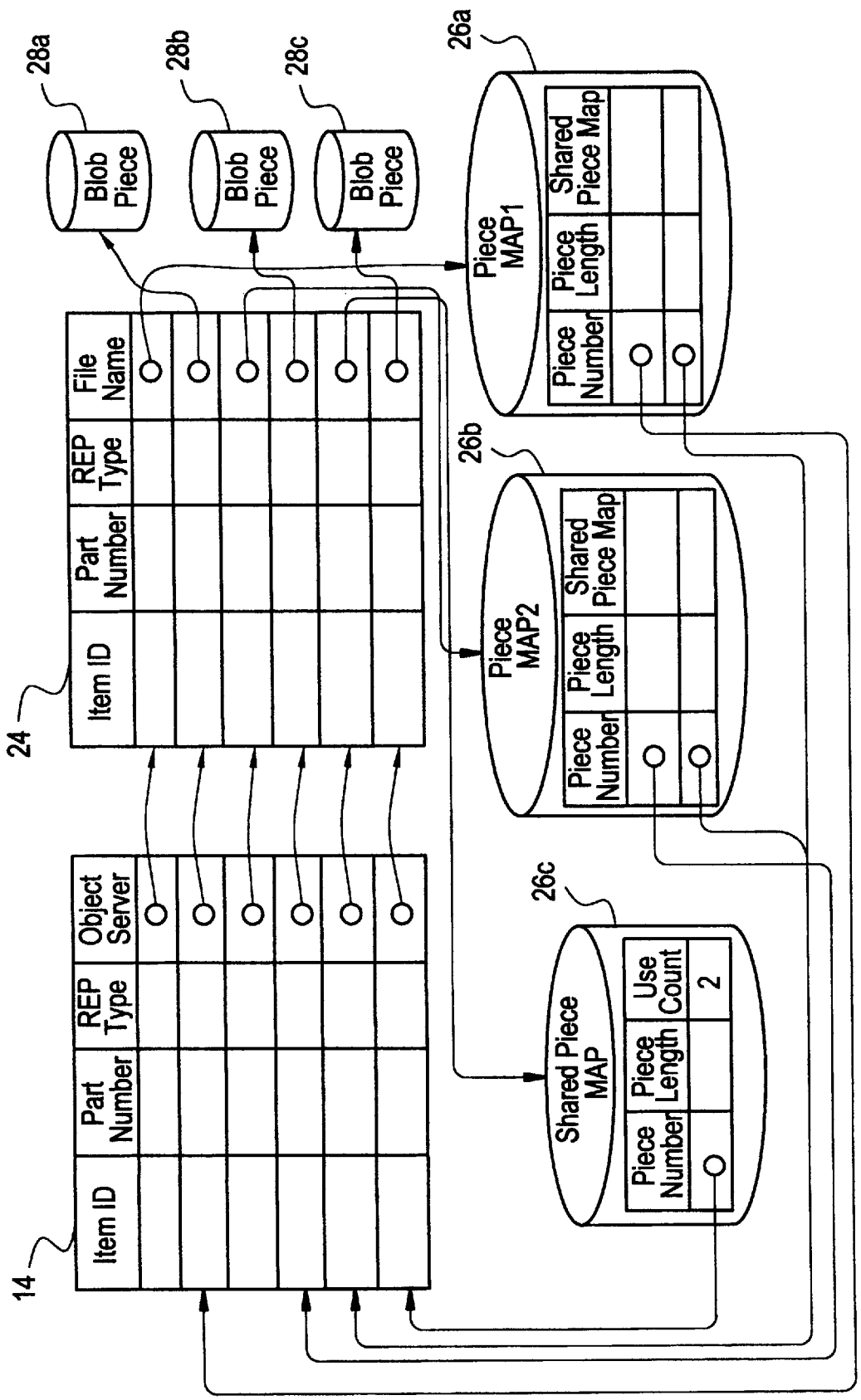
FIG. 5 shows a portion of the parts table of the library server and the object server table of the object server in the client/server library system according to the present invention according to another embodiment of the present invention.

The piece maps for this embodiment include an additional field shown as the "shared piece map" field in FIG. 5. The shared piece map field includes identifying information to identify a shared piece map 26*c* which references all the shared pieces in the library system. In a preferred embodiment the shared piece map field includes the item ID and part number for the shared piece map 26*c*, and a REP type to index into the shared piece map 26*c* to identify the specific shared piece.

In this instance both object 1 and object 2 share, or have in common, a second piece which is stored only once in object store 22. Here, blob piece 28*c* is referenced for both object 1 and object 2. Blob piece 28*c* is referenced in object 1 via piece map 1 in which the part number for the shared piece map is stored in the shared piece map field. Here, if item ID/part number/REP type information is present in the shared piece map field, then the piece corresponds to a shared piece. This information in the shared piece map field refers to parts table 14 which identifies a third piece map, which is the shared piece map 26*c*, rather than directly referencing the shared blob. The shared piece map 26*c* is used to keep track of all the shared pieces in the library system. For each shared piece identified in the shared piece map the number of objects which reference, or share that particular piece is stored. As shown in FIG. 5, shared piece map 26c contains a use count field for each piece that his shared. In this case, the use count equals "2" since two objects use the shared piece, namely, object 1 and object 2.

The REP type value of the shared piece map field of a piece map indicates an index into shared piece map 26c. Once the specified entry in shared piece map 26c is located, shared piece map 26c references the actual shared piece by the piece number stored in the piece number field. Here, the piece number field of shared piece map 3 provides a fully qualified reference into parts table 14, which thereby references the object server table 24, which references shared blob piece 28c. In this manner, any number of objects can share a piece without having to recreate and lo redundantly store the same piece.

The present invention also manages modifications and deletions of shared pieces. That is, when an application program requests deletion of a shared piece from an object server, client server 30 retrieves the shared piece map and simply reduces the use count of the specified shared piece by one. Library client 30 also retrieves the piece map for the object in which the shared piece is deleted and deletes the reference to that shared object in that object's piece map.

Also, if a shared object is changed for one of the objects which shares that piece, the library client preferably retrieves the shared piece and performs a delete operation on it. After the application program modifies the previously shared piece it then stores the modified piece as part of the object which contains the modified shared piece. Effectively, a new piece is created corresponding to the modified piece. Of course, if all objects which share the piece also share the modified piece then the shared piece is simply modified without changing references within the piece maps of the individual objects which share that piece.

In yet another embodiment the library client 30 and object server 20 are connected by a plurality of communications paths. A plurality of pieces are stored in object server 20 by simultaneous transmitting more than one piece between the library client 30 and the object server 20 via the plurality of communications paths. The plurality of communications paths can be implemented with a plurality of telecommunications lines. In a similar manner a plurality of pieces can be transmitted between the client and a plurality of object servers over the plurality of communication paths.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for storing and managing objects in a distributed information storage management system including a client, an object server for storing an object and a centralized server having information stored therein regarding the location of the object and the client, the method comprising the steps of:
    a) dividing a digital object into a plurality of pieces, wherein each of said pieces is smaller than said digital object;
    b) generating a piece map for storing piece identification information identifying each of said pieces, whereby access to the pieces is based on the piece identification information stored in the piece map;
    c) transmitting each of said pieces and said piece map from the client to the object server, storing the transmitted pieces and piece map in the object server and storing information about each of said pieces and said piece map in said centralized server.

2. The method recited in claim 1, wherein the centralized server includes a parts table and the object server includes an object server table, wherein step c) comprises the steps of:
    c1) storing in the object server, under control of the centralized server, said piece map and storing in the object server table piece map identification information identifying said piece map and location information identifying the storage location of said piece map;
    c2) storing in said parts table said piece map identification information of said piece map stored in step c1) and object server identification information indicating the object server in which said piece map is stored in step c1);
    c3) storing in the object server, under control of the centralized server, one of the transmitted pieces and storing in the object server table the piece identification information identifying the stored piece and location information identifying the storage location of the stored piece;
    c4) storing in said parts table the piece identification information for the piece stored in the object server in step c3) and object server identification information indicating the object server in which the piece is stored;
    c5) updating said piece map to include the piece identification information of the piece stored in step c3); and
    c6) repeating steps c3) through c5) for each of said transmitted pieces.

3. The method recited in claim 2, wherein said digital object and each of said pieces is a computer file.

4. The method recited in claim 2, wherein step a) is performed if said-digital object exceeds a predetermined size.

5. The method recited in claim 4, wherein said digital object is larger than or equal to 10 megabytes.

6. A method for storing and managing objects in a distributed information storage management system, the method comprising the steps of:
    a) dividing a digital object into a plurality of pieces, wherein each of said pieces is smaller than said digital object;
    b) generating a piece map for storing therein piece identification information identifying each of said pieces;
    c) storing each of said plurality of pieces in one of a plurality of storage devices; and
    d) storing the piece identification information in said piece map for each of said plurality of pieces stored in step c) and storing said piece map in one of said plurality of storage devices, wherein at least two of said plurality of pieces are stored on different ones of said plurality of storage devices, and whereby access to the pieces is based on the piece identification information stored in the piece map.

7. The method recited in claim 6, wherein step a) is performed if said digital object exceeds a predetermined size.

8. The method recited in claim 6, wherein said digital object is larger than or equal to 10 megabytes.

9. The method recited in claim 6, further comprising the steps of:
    e) retrieving from said one of said plurality of storage devices said piece map and extracting said piece identification information from said piece map;
    f) retrieving from said plurality of storage devices each of said plurality of pieces based on said piece identification information extracted in step e); and g) reconstituting said digital object from said plurality of pieces retrieved in step f).

10. The method recited in claim 9, wherein said digital object is a computer file, and each of said plurality of pieces is a computer file having a variable length.

11. The method recited in claim 9, wherein step f) comprises the step of simultaneously sending said plurality of pieces from at least one of said plurality of storage devices to the client over a plurality of communications paths.

12. The method recited in claim 6, wherein the distributed storage management system includes a client, an object server for storing an object and a centralized server having information stored therein regarding the client and the location of the object, the method further comprising the steps of:

e) storing in the centralized server identification information identifying each of said plurality of pieces and said piece map, and identifying the storage devices upon which said plurality of pieces and said piece map are stored.

13. The method recited in claim 12, further comprising the steps of:

f) sending a map retrieval request from the client to the centralized server to retrieve said piece map, wherein in response to said map retrieval request the centralized server sends a command to the object server which in response thereto sends a copy of said piece map to the client;

g) extracting said piece identification information from said piece map sent to the client;

h) sending a piece retrieval request from the client to the centralized server to retrieve one of said plurality of pieces as a requested piece according to said piece identification information extracted in step g), wherein in response to said piece retrieval request the centralized server sends a command to the object server which in response thereto sends a copy of said requested piece to the client;

i) repeating step h) for each of said plurality of pieces; and j) reconstituting said digital object from said plurality of pieces retrieved in steps h) and i).

14. The method recited in claim 6, wherein step c) comprises the step of sending said plurality of pieces to said plurality of storage devices over a plurality of communications paths.

15. The method recited in claim 6, wherein the size of any one of said plurality of pieces is changed without affecting any other of said plurality of pieces.

16. The method recited in claim 6, wherein any one of said plurality of pieces is deleted without affecting any other of said plurality of pieces.

17. A system for storing and managing objects, comprised of:

a client for dividing a digital object into a plurality of pieces;

one or more object servers for storing a piece map and said plurality of pieces, wherein said piece map includes piece identifying information identifying each of said plurality of pieces, whereby access to the pieces is based on the piece identification information in the piece map; and a centralized server having a parts table for storing said piece identifying information and piece location information identifying which one of said object servers each of said plurality of pieces is stored, and storing piece map identification information identifying said piece map and piece map location information identifying one of said object servers within which said piece map is stored.

18. The system recited in claim 17, wherein said client sends a request to said centralized server for retrieval of said digital object, wherein in response thereto said centralized server sends a request to said object server to send said client a copy of said piece map and said object server in response to said request from said centralized server sends a copy of said piece map to said client, whereupon said client receives said copy of said piece map and extracts said piece identifying information from said piece map and sends requests to said centralized server for each of said plurality of pieces, whereupon said centralized server in response thereto sends requests to said one or more object servers to send copies of said plurality of pieces to said client, whereupon in response thereto each of said one or more object servers sends a copy of the pieces stored therein to said client.

19. The system recited in claim 18, wherein said client receives said copies of the pieces sent from said one or more object servers and reconstructs said digital object from the received pieces.

20. The system recited in claim 18, further comprising a plurality of communications paths between said client and one of said one or more object servers, wherein said one of said one or more object servers simultaneously sends a plurality of pieces stored therein to said client over said plurality of communications paths.

21. The system recited in claim 17, wherein said plurality of pieces includes a shared piece which is one of a plurality of pieces for another digital object, wherein the identifying information for said shared piece contained in the piece map for said digital object refers to another piece map which includes identifying information for only said shared piece and a use count, wherein the use count indicates the number of digital objects in which said shared piece is one of the plurality of pieces for said digital objects.

22. The system recited in claim 17, wherein the size of any one of said plurality of pieces is changed without affecting any other of said plurality of pieces.

23. The method recited in claim 17, wherein any one of said plurality of pieces is deleted without affecting any other of said plurality of pieces.

24. The method recited in claim 17, wherein said digital object is larger than or equal to 10 megabytes.

25. A computer-readable medium of instructions, comprising:

program code for a client for dividing a digital object into a plurality of pieces;

program code for one or more object servers for storing a piece map and said plurality of pieces, wherein said piece map includes piece identifying information identifying each of said plurality of pieces, whereby access to the pieces is based on the piece identifying information in the piece map; and program code for a centralized server having a parts table for storing said piece identifying information and piece location information identifying which one of said object servers each of said plurality of pieces is stored, and storing piece map identification information identifying said piece map and piece map location information identifying one of said object servers upon which said piece map is stored.

26. The computer-readable medium of instructions recited in claim 25, wherein said program code of the client causes a request to be sent to said centralized server for retrieval of said digital object, wherein in response thereto said program code for the centralized server causes a request to be sent to one of said object servers to send said client a copy of said map piece and said program code for the object server in response to said request from said centralized server causes a copy of said map piece to be sent to said client, whereupon said client receives said copy of said map piece and the program code for the client causes said piece identifying information to be extracted from said piece map and causes requests to be sent to said centralized server for each of said plurality of pieces, whereupon said program code for the centralized server in response thereto causes requests to be sent to said one or more object servers to send copies of said plurality of pieces to said client, whereupon in response thereto the program code for each of said one or more object servers causes a copy of the pieces stored therein to be sent to said client.

27. The computer-readable medium of instructions recited in claim 26, wherein said client receives said copies of the pieces sent from said one or more object servers and reconstructs said digital object from the received pieces.

28. The computer-readable medium of instructions recited in claim 26, wherein a plurality of communications paths connect said client and one of said one or more object servers, wherein said one of said one or more object servers simultaneously sends a plurality of pieces stored therein to said client over said plurality of communications paths.

29. The computer-readable medium of instructions recited in claim 25, wherein said plurality of pieces includes a shared piece which is one of a plurality of pieces for another digital object, wherein the identifying information for said shared piece contained in the piece map for said digital object refers to another piece map which includes identifying information for only said shared piece and a use count, wherein the use count indicates the number of digital objects in which said shared piece is one of the plurality of pieces for said digital objects.

30. The computer-readable medium of instructions recited in claim 25, wherein the size of any one of said plurality of pieces is changed without affecting any other of said plurality of pieces.

31. The computer-readable medium of instructions recited in claim 25, wherein any one of said plurality of pieces is deleted without affecting any other of said plurality of pieces.

32. The computer-readable medium of instructions recited in claim 25, wherein said digital object is larger than or equal to 10 megabytes.

33. A method performed on or with the aid of a computer, comprising:
   a) dividing a digital object into a plurality of pieces, wherein each of said pieces is smaller than said digital object;
   b) generating a piece map for storing therein piece identification information identifying each of said pieces, whereby access to the pieces is based on the piece identifying information stored in the piece map;
   c) storing each of said plurality of pieces in one of a plurality of storage devices; and
   d) storing the piece identification information in said piece map for each of said plurality of pieces stored in step c) and storing said piece map in one of said plurality of storage devices, wherein at least two of said plurality of pieces are stored on different ones of said plurality of storage devices.

34. The method recited in claim 1, wherein the object server and the centralized server are different servers.

35. The system recited in claim 17, wherein said object servers and said centralized server are different servers.

36. The computer-readable medium of instructions recited in claim 25, wherein said object servers and said centralized server are different servers.

* * * * *

UNITED STATES PATENT AND TRADEMARK OFFICE
CERTIFICATE OF CORRECTION

PATENT NO. : 5,857,203
DATED : January 5, 1999
INVENTOR(S) : Steven V. Kauffman, Lara M. Lewis, Ronal E. Parrish It is certified that error appears in the above-identified patent and that said Letters Patent is hereby corrected as shown below:

<u>Column 1</u>

Line 17, delete "lo".

<u>Column 13</u>

Line 13, delete "lo".

Signed and Sealed this

Twenty-eighth Day of March, 2000

Attest:

Q. TODD DICKINSON

*Attesting Officer*      *Commissioner of Patents and Trademarks*